United States Patent [19]
Shepard et al.

[11] Patent Number: 5,350,481
[45] Date of Patent: Sep. 27, 1994

[54] REPAIR DEVICE FOR ELASTOMERIC WALL

[76] Inventors: Steven M. Shepard, 23656 Hunter's La., Southfield, Mich. 48034; William A. Moncrief, 8091 Bingham, Detroit, Mich. 48228

[21] Appl. No.: 105,982

[22] Filed: Aug. 10, 1993

[51] Int. Cl.$^5$ .............................................. B29C 73/14
[52] U.S. Cl. ................................... 156/423; 152/369; 156/97
[58] Field of Search ...................... 156/94, 97, 98, 305, 156/423, 514; 152/367, 368, 369; 138/98; 29/402.12, 402.14, 402.15, 402.17; 428/321.5, 63, 320.2, 321.1; 411/340; 114/227, 228; 220/235; 52/27

[56] References Cited

U.S. PATENT DOCUMENTS

| | | | |
|---|---|---|---|
| 503,079 | 8/1893 | Gowen | 152/369 |
| 897,932 | 9/1908 | Sampson | 152/369 |
| 1,676,395 | 7/1928 | Körner | 114/228 |
| 2,585,635 | 2/1952 | Dibble | 156/97 |
| 2,907,682 | 10/1959 | Eichel | 428/321.5 |
| 3,639,137 | 2/1972 | Marinelli | 428/321.5 |
| 4,080,238 | 3/1978 | Wolinski et al. | 428/321.5 |
| 4,420,533 | 12/1983 | Preiser et al. | 428/321.5 |
| 4,509,243 | 4/1985 | Schneider et al. | 138/98 |
| 4,530,630 | 7/1985 | Brown | 411/340 |
| 4,574,971 | 3/1986 | Leonard | 220/235 |

Primary Examiner—Geoffrey L. Knable
Attorney, Agent, or Firm—Peter A. Taucher; David L. Kuhn

[57] ABSTRACT

Disclosed is a device to repair ruptures in the wall of a flexible pressurizable enclosure. The device has an apertured plate on the wall's outer surface, and has a threaded fastener protruding through the aperture and rupture into the enclosure. A butterfly member threaded to the fastener within the enclosure has clamping members swingable out from the fastener so that engagement surfaces on the clamping members face the ruptured zone of the wall. A layer on the engagement surfaces has a curable adhesive resin initially segregated from a setting agent therefor, which is also in the layer. The segregation of resin and setting agent is achieved by enclosing at least one of these substances in capsules distributed within the layer. Once the clamping members swing away from the fastener, turning the fastener moves the clamping members to press them on the inner surface zone of the enclosure wall. The wall is thus sealingly pressed between the clamping members and the plate on the wall's outer surface.

16 Claims, 6 Drawing Sheets

Fig. 16 ic wall

REPAIR DEVICE FOR ELASTOMERIC WALL

GOVERNMENT USE

The invention described herein may be manufactured, used and licensed by or for the U.S. Government for governmental purposes without payment to us of any royalty thereon.

BACKGROUND AND SUMMARY

Wheeled vehicles used by military forces commonly travel off-road with heavy loads at high speed. Although vehicles travelling under these conditions experience relatively frequent tire punctures or ruptures, it is desirable to carry a minimum of spare tires, since space and weight in these vehicles is at a premium. It is thus advantageous to make repairs on the tires quickly, under field conditions, and in a way that permits the tire to perform under extreme conditions. Our invention will allows the effect of such repairs. Our invention is also a means to repair almost any inflatable object or even items such as boat hulls, water tanks or pipes.

Our device has an apertured plate placed on the item's outer surface at a rupture, and has an elongate member extending through the aperture into the item. The device's butterfly element is threaded to the elongate member and pushed inside the item. Wing-like clamping members of the butterfly element swing away from the elongate member so that engagement surfaces of the clamping members face the item's ruptured zone. On the engagement surfaces is a material comprised of a curable adhesive resin separated from a setting agent therefor wherein the resin, its setting agent, or both are in capsules such as hollow glass spheres. Turning the elongate member draws the clamping members to the item's inner surface so that the damaged portion of the wall or skin of the item is clamped between the clamping elements and the plate. The mechanical clamping action is reinforced by the adhesive action of the resin which sets when the clamping action breaks the capsules at the clamping members' engagement surfaces. Our device also has means to prevent pressurized air or other pressurized fluid from escaping the repaired item along the elongate member. Such means can be placed at the aperture in the plate, on the butterfly element, or at both locations. Our device optionally has more than two clamping members on the butterfly element, and the butterfly element can have means both to limit the swing of the clamping elements and reinforce the clamping members once they have reached the limit of that swing.

DETAILED DESCRIPTION

Figure 1:
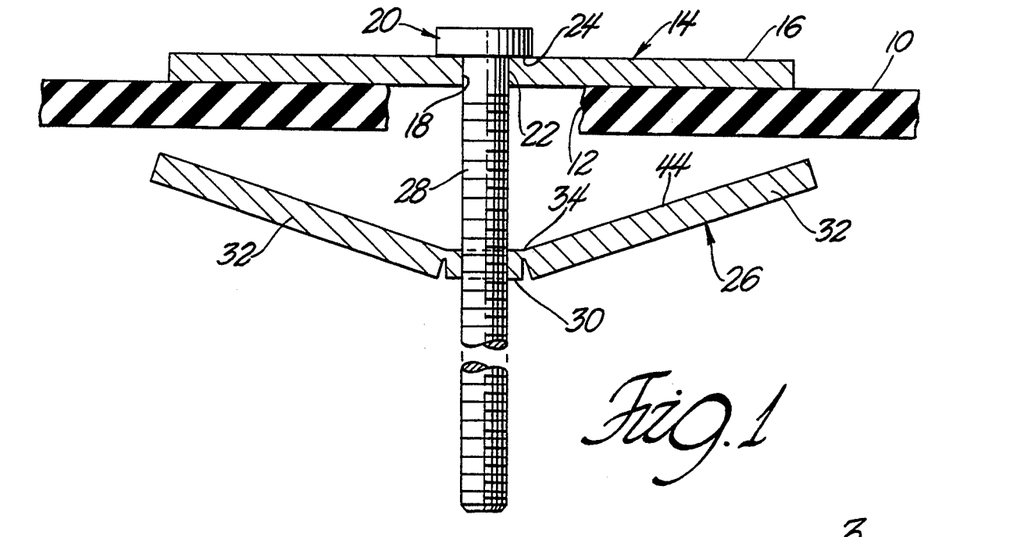
FIG. 1 is a sectional view showing a first embodiment of our device.

FIG. 1 shows a wall 10 of a tire, some other inflatable elastomeric body, a hull or a pipe. The wall has a rupture at 12, at which our repair device 14 has been located. The repair device has a flat plate 16 that conformingly facially bears on the outer surface of wall 10 and defines a smooth, round through hole 18. Extending through hole 18 is a conventional screw or bolt 20 having a smooth shank portion 22 fit closely in hole 18. Shoulder 24 of the bolt fits against the outer surface of wall 10 and preferably seals therewith. Adjacent smooth shank portion 22 is threaded portion 28, which engages a complimentarily threaded intermediate segment 30 of articulated butterfly element 26. When bolt 20 rotates, intermediate segment 30 moves axially relative to bolt 20, toward or away from bolt end 21.

Figure 11:
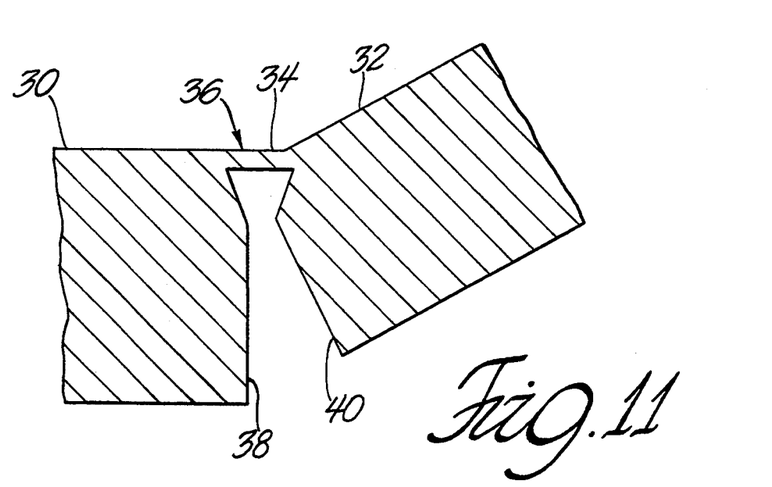
FIG. 11 is a detail sectional view of the FIG. 1 structure connecting the intermediate segment to the clamping members.

Butterfly element 26 includes two arm-like flat rectangular clamping members 32 that face toward the inner surface of wall 10 in FIG. 1. Clamping members 32 are integrally joined to intermediate segment 30 by deformable neck 34, a detail view of neck 34 being shown in FIG. 11. As seen in that figure, clamping member 32 and intermediate segment 30 define opposed abutment surfaces 40 and 38 which together form an angle whose apex is at point 36. When clamping members are moved down from their FIG. 1 position to a position perpendicular to bolt 20, surfaces 38 and 40 will meet so as to stop further downward swing of the clamping members. Clamping members 32 and plate 16 may exhibit spring-like flexibility in order to elastically deform with wall 10. Such flexibility would be desirable, for example, if wall 10 is the sidewall zone of a tire near the tread thereof.

Figure 7:
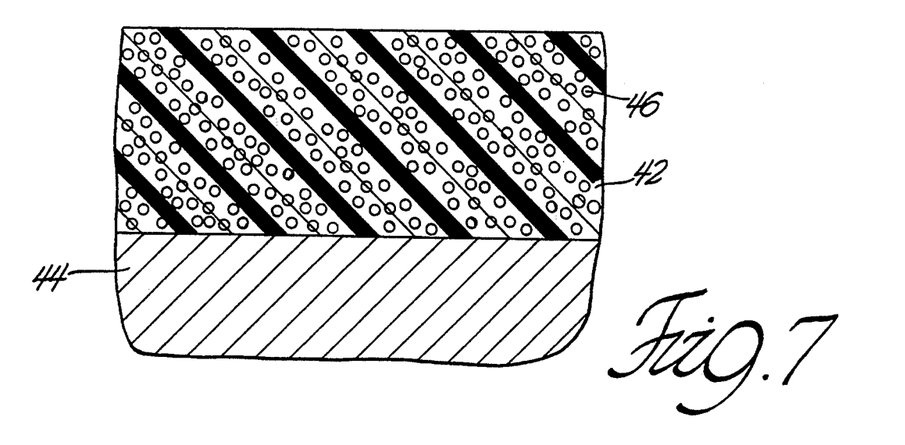
FIG. 7 is an enlarged view of a layer of material on a clamping element surface of the butterfly element.

FIG. 7 shows a detail view of the upper, wall engaging surface 44 of clamping member 32 wherein a thin, preferably flexible matrix or coating 42 of curable resin covers surface 44. Within the matrix are entrapped capsules 46 of glass or similarly breakable material. Capsules 46 contain a suitable hardening or curing agent that will affect the matrix material to form a strong adhesive when the capsules are broken. When bolt 20 turns and forces clamping members 32 against wall 10, matrix 42 is squeezed and capsules 46 are broken, and thereafter a strong adhesive bond is formed between clamping member 32 and wall 10. A flexible curable resin matrix and entrapped curing agent capsules similar to the FIG. 7 combination may optionally be placed on the underside of plate 16, which bears on wall 10, or may be placed between shoulder 24 and plate 16 to act as a sealant, or may be placed between shank portion 22 and the inner diameter of hole 18 to act as a sealant.

Figure 8:
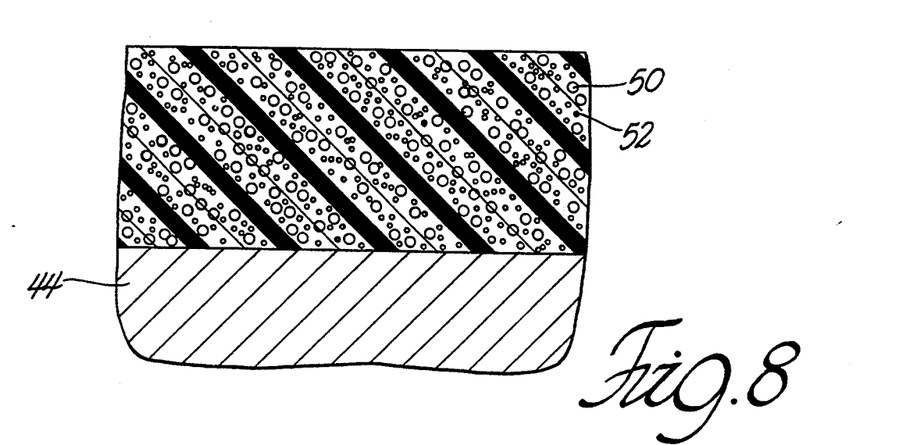
FIG. 8 depicts a variation of the layer of material shown in FIG. 7.

In FIG. 8 is shown a variation of the FIG. 7 combination, wherein matrix 48 is a soft material containing two sets of glass capsules. A curable resin is contained in capsules 50 and a setting agent is contained in capsules 52. In either the FIG. 7 or FIG. 8 combination, it is contemplated that surfaces 44, 38 and 40 having one of these combinations will exhibit no adhesiveness prior to breaking of the capsules.

Figure 2:
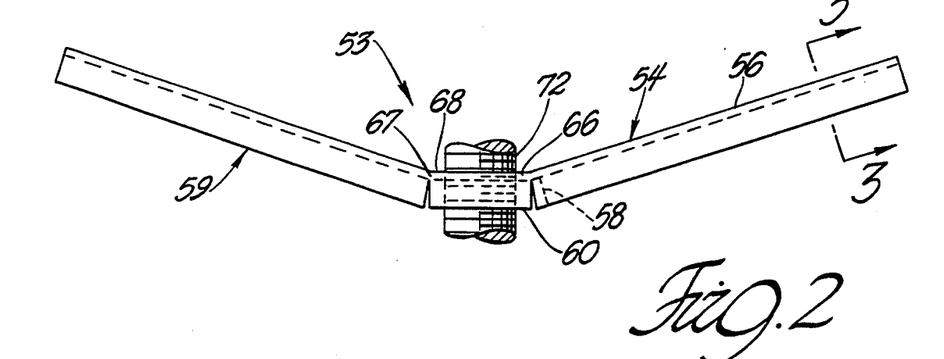
FIG. 2 is a front elevational view of a modified butterfly element for our device, the left side of FIG. 2 showing a slight possible variant of the right side of FIG. 2.
Figure 3:
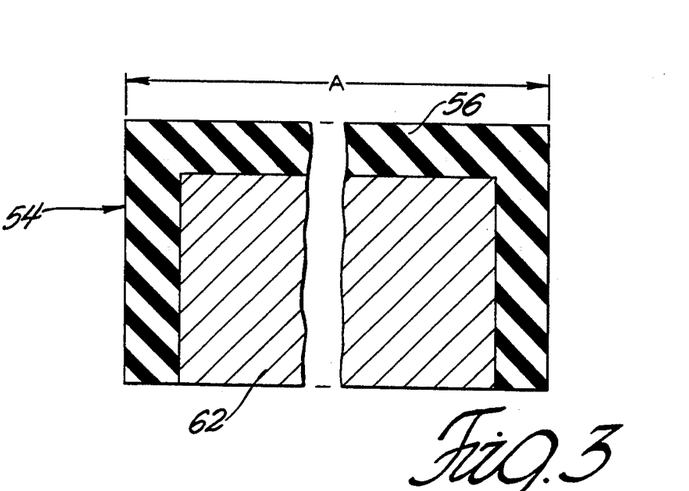
FIG. 3 is a view taken along line 3—3 in FIG. 2.

The right side of FIG. 2 shows an alternate embodiment 54 of the clamping member on butterfly element 53 wherein the clamping member has an exterior 56 formed by channel of flexible material. As seen by viewing FIG. 3 and the right side of FIG. 4, the channel has a metal bar 62 fit therein and has an end piece 58 opposing intermediate segment 60. End piece 58 forms a gap 64 with flexible neck 66, which integrally connects exterior 56 with outer channel 68 of intermediate segment 60. As shown by FIG. 5, outer channel 68 has therein a body 70 of elastomeric material softer and more flexible than the outer channel. A screw or bolt 72 similar to bolt 20 (FIG. 1) threads with and through channel 68 and body 70.

It will be noted that width "A" (FIG. 3) of the clamping members is equal to or less width "B" (FIG. 5) of body 70. By this construction, no part of the clamping member interferes with sides 74 of outer channel 68 as the clamping member swings down 25 from the FIG. 2 position to a deployed position where the clamping member is perpendicular to bolt 72. As the clamping member approaches the deployed position, engagement surface 76 on end 58 swings from the FIG. 4 position to the position at dashed line 78, whereby surface 76 compresses body 70. Sides 74 restrict lateral expansion of body 70 so that the body tightens on bolt 70 all about the circumference of the bolt and forms a seal with the bolt. The clamping members, intermediate segment 60, necks 66 and bolt 70 form an air tight unit with wall 10 (FIG. 1) when the clamping members are pressed and adhered thereto.

Figure 4:
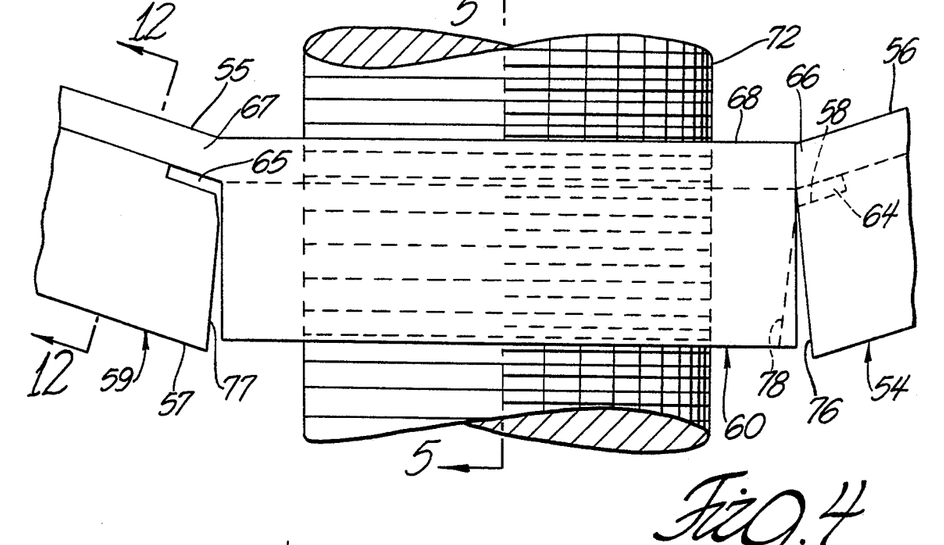
FIG. 4 is a detail view of the intermediate segment and surrounding structure of the butterfly element seen in FIG. 2, the right and left sides of FIG. 4 showing slightly different possible variations of the butterfly element.
Figure 5:
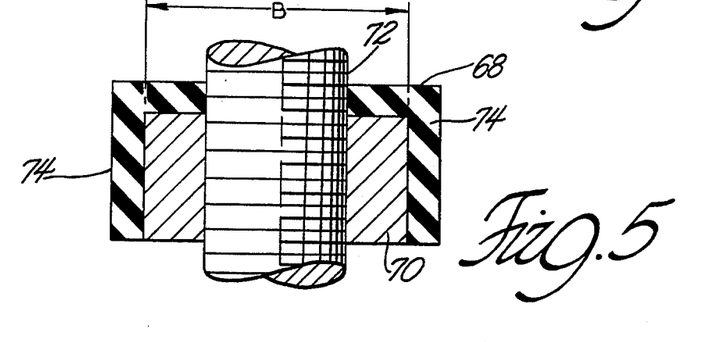
FIG. 5 is a view along line 5—5 in FIG. 4.
Figure 12:
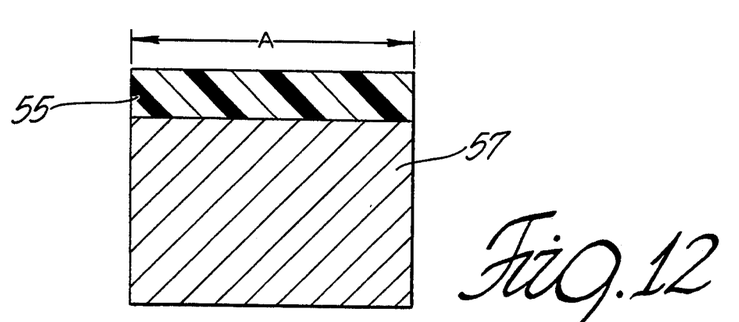
FIG. 12 is a modification of the cross section of the clamping element shown in FIG. 3.

A variation 59 of the clamping member at the right sides of FIG. 2 and FIG. 4 is shown in the left sides of those figures and in FIG. 12. There, bar 55 is integrally connected to outer channel 68 by flexible neck 67. Attached to bar 55 is strut 57 defining gap 65 with neck 67 and having a flat engagement surface 77 opposed to elastomeric body 70 (FIG. 3) of intermediate segment 60. As the clamping member on the left side of FIG. 4 swings down, engagement surface 77 swings counterclockwise from the FIG. 4 position to compress body 70 in the same fashion as does engagement surface 76. The clamping member on the left side FIG. 4 has the same width "A" as clamping member 54 at the right of the figure.

Figure 9:
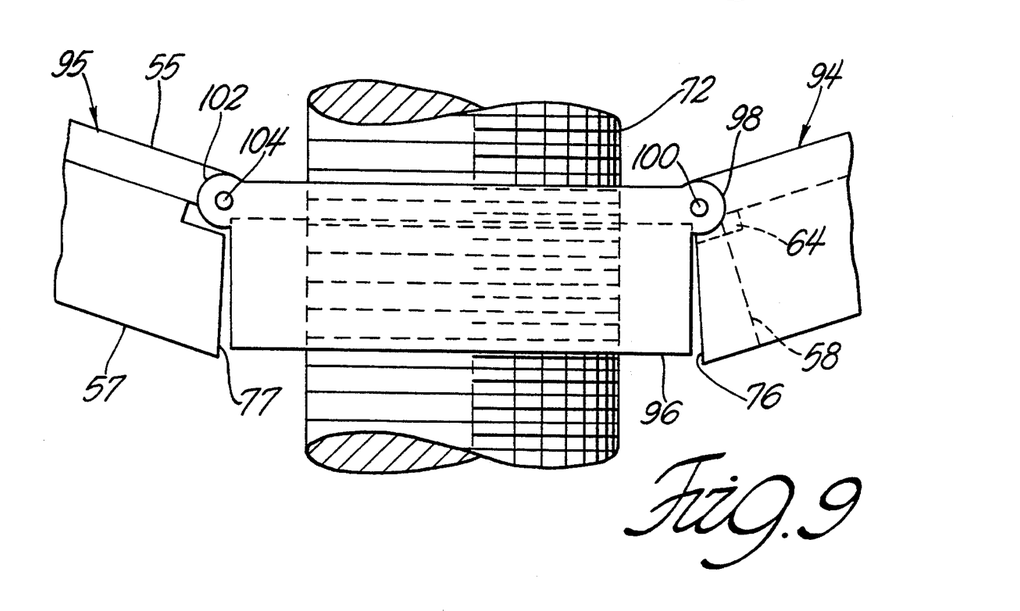
FIG. 9 is a detail view showing a modification to the intermediate segment and surrounding structure of FIG. 4.

FIG. 9 shows a modified version 94 of the FIG. 4's right side clamping member 54 and shows a modified version 96 of the intermediate segment 60. The modification is the replacement of neck 66 by a swivel attachment comprising axis pin 100 journalled 25 through member 94 and eyes 98 on segment 96. FIG. 9 also shows a modified version 95 of the FIG. 4 left side clamping member 59 swivelled to eyes 102 on segment 96 by axis pin 104.

Figure 6:
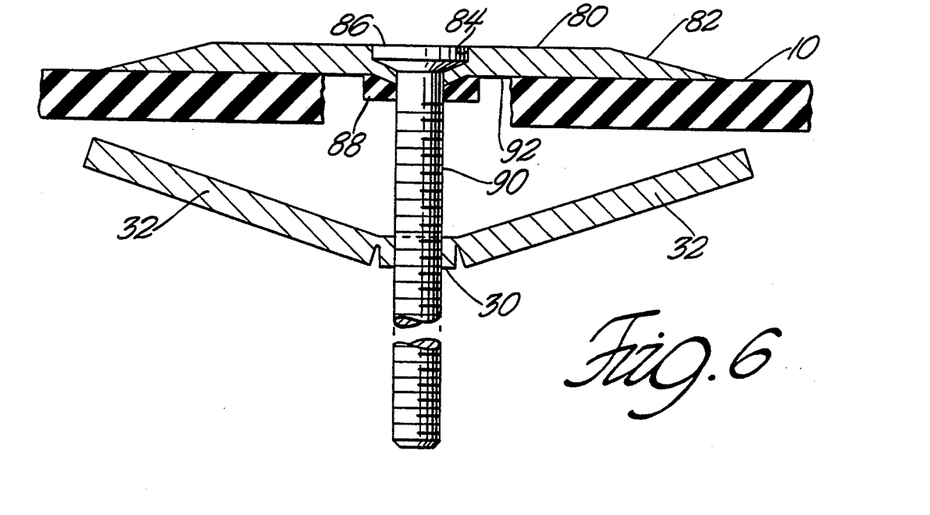
FIG. 6 is a sectional view of another embodiment of our device.

FIG. 6 shows a variation of the FIG. 1 embodiment wherein flat plate 16 is replaced by plate 80 having a tapered peripheral edge 82 that forms a smooth transition between the outer surface of plate 80 and the outer surface of wall 10. Additionally, plate 80 defines a stepped bore 84 into which the head of screw or bolt 90 is countersunk so that the top 86 of the bolt head is flush with or below the outer surface of plate 80. It is believed that the structure of plate 80 will be desirable in applications where wall is part of a pressurizable or waterproof inner liner or bladder for an outer casing. Such an inner liner could be, for example, the inner tube of a tire. Optionally, a flexible gasket 88 is provided about bolt 90 adjacent plate 80 at the inner end of bore 84. Pressure acting against exposed inner surface 92 of plate 80 will force gasket 88 into tighter relation with bolt 90 and plate 80 so that the sealing action of gasket 88 will increase as this pressure increases.

Figure 10:
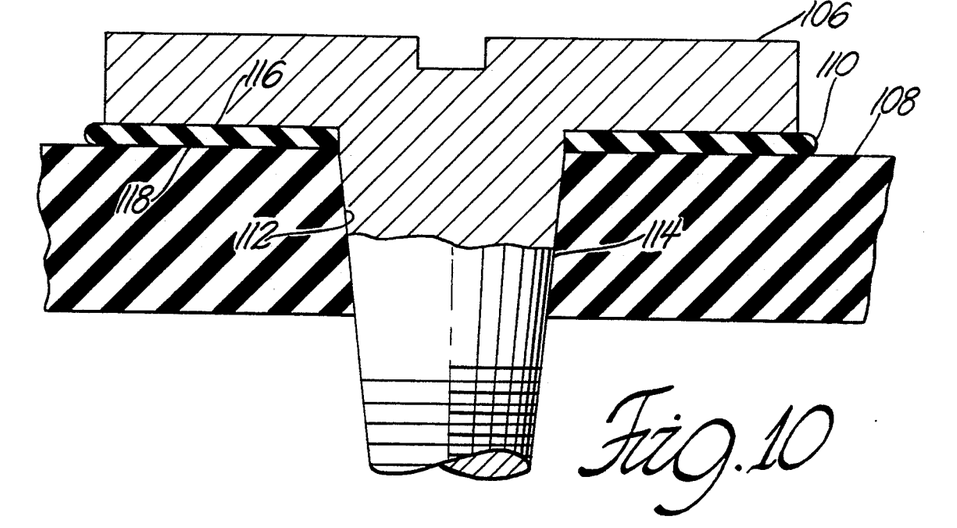
FIG. 10 is a detail sectional view of a fastener head that optionally replaces the fastener head shown in FIG. 1.

FIG. 10 shows an optional connection between a bolt and a flat plate which may replace the connection between bolt 20 and flat plate 16 in FIG. 1. In FIG. 10, flat plate 108 defines a tapered aperture 112 into which closely fits a complimentarily tapered shank portion 114 of the bolt. An elastically deformable annular seal 110, shown in compressed condition, is sandwiched between the bolt's head 106 and plate 108. Either or both interfaces 116 and 118 may be provided with a layer of matrix material such as those shown in FIGS. 7 and 8 to bond seal 110 to head 106 and plate 110.

Figure 13:
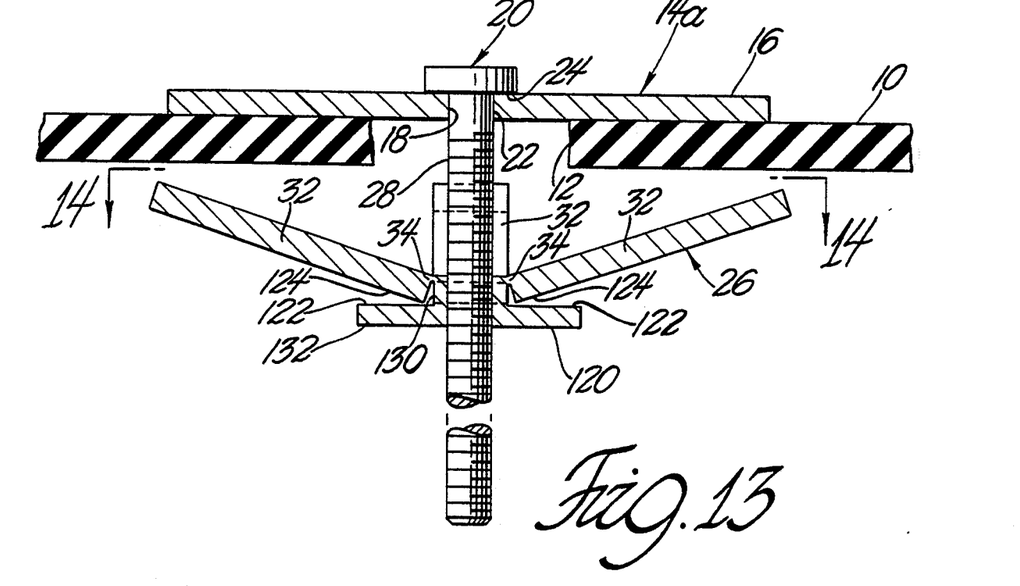
FIG. 13 is a sectional view of a further embodiment of our device.
Figure 14:
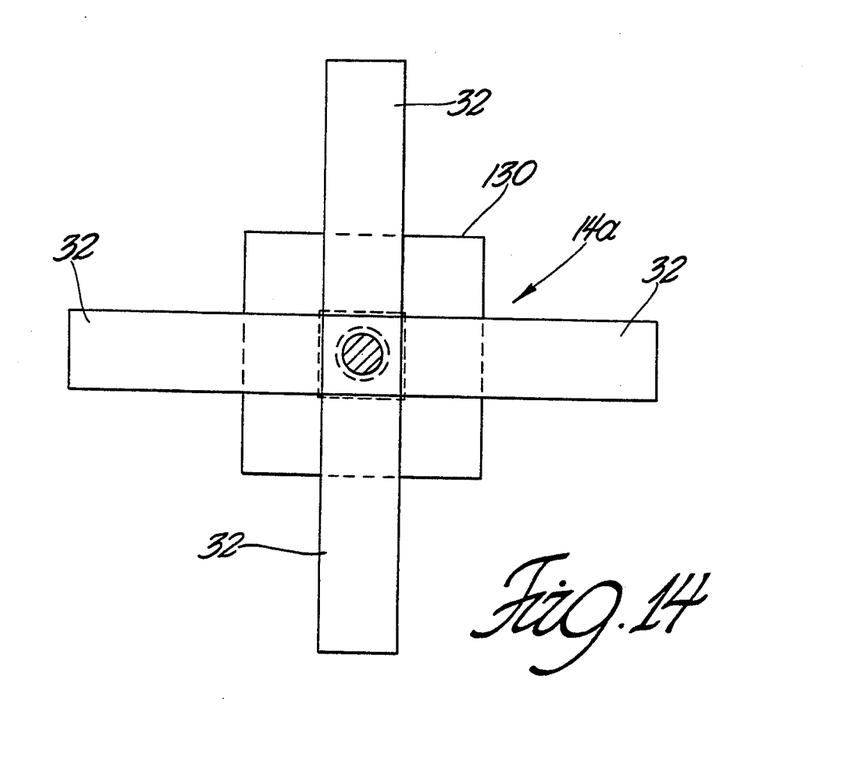
FIG. 14 is a view taken along line 14—14 in FIG. 13.

FIGS. 13 and 14 show a variation 14A of repair device 14 of FIG. 1. On repair device 14A, two additional clamping members 32 are added, and plate 16 is typically modified to be square or circular, so as to oppose all four clamping members 32. All four clamping members 32 radiate from intermediate member 130 and are hinged to intermediate member 130 by necks 34. Fixed to and preferably integral with intermediate member 130 is flat annular flange 120 having an upper surface 122 that face surface zones 124 of the clamping members. After clamping members swing out from bolt 20, surface 122 will bear on zone 124 so that flange 120 prevents further swinging of clamping members 32 and will brace the clamping members as the press against sidewall 10.

Figure 15:
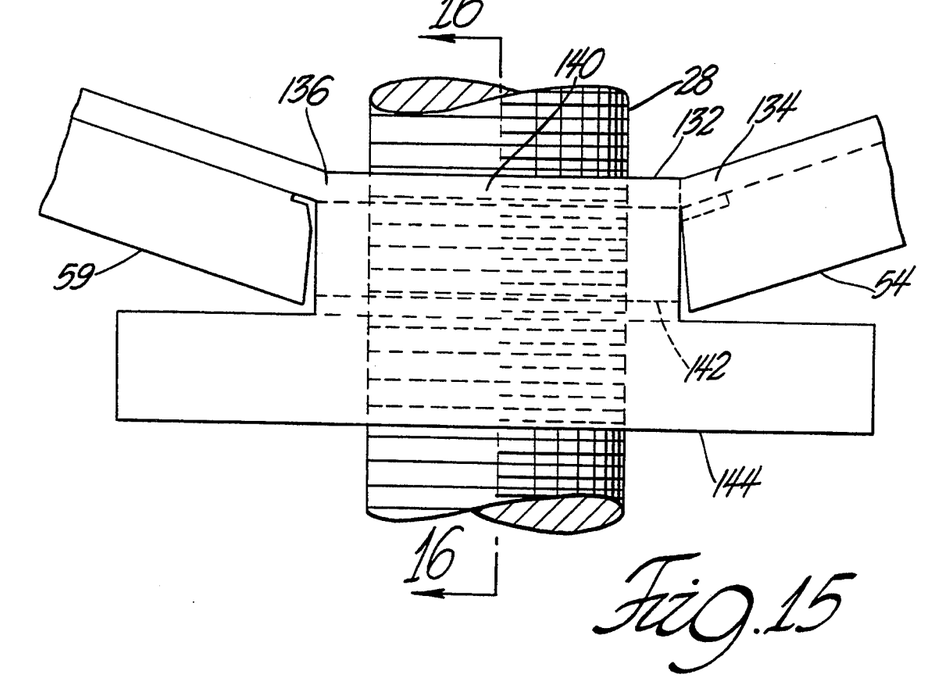
FIG. 15 is a side elevational view of a modified intermediate member and the surounding structure.
Figure 16:
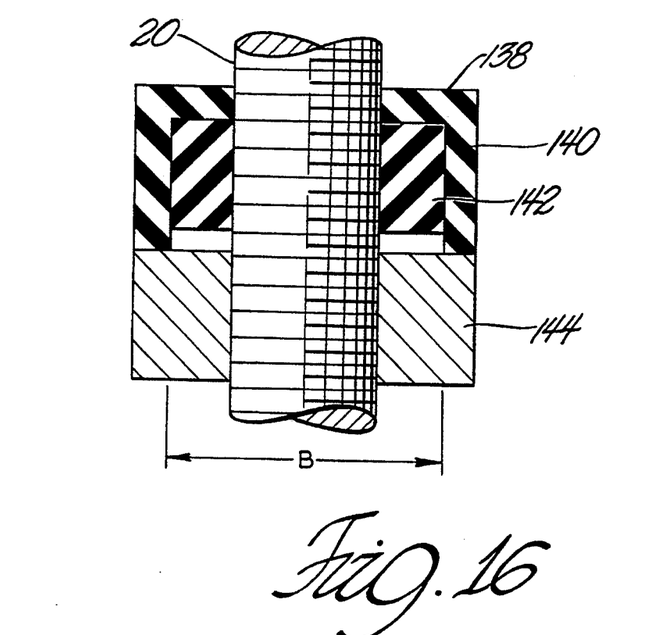
FIG. 16 is a view taken along line 16—16 in FIG. 15.

FIG. 15 shows clamping members 54 and 59 (also shown in FIG. 4) connected to a variation 132 of intermediate segment 60. Clamping members 54 and 59 are hinged to intermediate segment 132 respectively by flexible necks 134 and 136, these flexible necks being integrally connected to web 138 (FIG. 16) of channel body 140. A deformable elastomeric body 142 fits closely within channel body 140 and also fits closely with threaded portion 28 of bolt 20. Opposed to elastomeric body 142 and fixed to the sides of channel body 140 is a bar 144 of relatively stiff elastomeric material or of metal. Bar 144 has a width "B" which is greater than the width of the clamping members, as exemplified by dimension "A" in FIGS. 3 and 12. Threaded portion 28 of the bolt threads through web 138 and elastomeric body 142, and can pass threadingly or unthreadingly through bar 144. Bar 144 stops clamping members 59 and 54 after these members swing down and thereafter braces them as they are pressed against wall 10 (FIG. 1).

OPERATION

The explanation of the operation of our repair device is given with reference to the FIG. 1 embodiment, but also applies to the operation of embodiments shown in other figures. The first operational step is to insure that clamping members 32 of butterfly element 26 are folded along threaded segment 28 at a position between flat plate 16 and intermediate segment 30. Enough distance is left between clamping members 32 and flat plate 16 to accommodate the thickness of the wall 10 to be repaired. Bolt 20 and butterfly element 26 are inserted through rupture 12 until plate 16 contacts the outer surface of wall 10. Bolt 20 is turned so that intermediate segment 30 translates toward plate 16, whereby clamping members swing out from bolt 20 upon contacting wall 10 so that surfaces 44 face the wall. Bolt 20 is turned until surfaces 44 are clamped against the inner surface of wall 10 sufficiently tightly to break capsules separating the curable resin and the setting agent on surface 44. The adhesive bond at the interface between surface 44 and the inner surface of wall 10 and the clamping effect of device 14 will close and seal rupture 12.

We wish it to be understood that we do not desire to be limited to the exact details of construction or method shown herein since obvious modifications will occur to those skilled in the relevant arts without departing from the spirit and scope of the following claims.

We claim:

1. A device for effecting repair impermeable to a fluid for a hole in a wall, comprising:
   a plate defining an aperture;
   an elongate member extending through the aperture;
   an intermediate member engaged to the elongate member;
   clamping members movably connected to the intermediate member, the clamping members having a folded position where the clamping members are disposed along the elongate member, the clamping members movable from the folded position to a deployed position;
   wall engaging surfaces on the clamping members, the wall engaging surfaces faced toward the plate during the deployed position of the clamping members;
   a layer on the engaging surfaces, the layer comprised of two at least initially segregated substances, a first substance being a curable adhesive resin and a second substance being a setting agent for the resin, at least one of the substances contained in breakable capsules in the layer;
   the intermediate member defining a channel having open ends;
   an elastomeric body in the channel engaging the elongate member, the body being softer than the channel;
   end faces of the clamping members pressing the body at the channel's open ends during the deployed position of the clamping members, thereby sealingly tightening the contact between the body and the elongate member.

2. The device of claim 1, further comprising:
   a head on the elongate member larger than the aperture, the head disposed on the opposite side of the plate from the intermediate member;
   a surface of the head faced toward the plate and closely fittable against the plate;
   the device having a tightened configuration wherein the head fits closely against the plate and the engaging surfaces are faced against the wall.

3. The device of claim 2 wherein the layer is a first layer and the device has a second layer at an interface between the head and the plate, the second layer comprising the two at least initially segregated substances, the first substance being the curable adhesive resin and the second substance being the setting agent for the resin, at least the one of the substances contained in the breakable capsules in the layer.

4. The device of claim 1, further comprising:
   a shank portion of the elongate member fittable closely with the aperture;
   the device having a tightened configuration wherein the shank portion fits closely and sealingly with the aperture and the engaging surfaces are faced against the wall.

5. The device of claim 4 wherein the layer is a first layer and the device has a second layer at an interface between the shank portion and an inner peripheral surface of the aperture, the second layer comprising the two at least initially segregated substances, the first substance being the curable adhesive resin and the second substance being the setting agent for the resin, at least the one of the substances contained in the breakable capsules in the layer.

6. The device of claim 1 further including flexible necks between the ends of the channel and the clamping members.

7. The device of claim 6 further including:
   zones of the clamping member adjacent the end faces;
   the clamping member zones and the neck defining gaps therebetween.

8. The device of claim 1 wherein the layer comprises:
   a matrix of the first substance;
   the second substance in the capsules, the capsules being distributed throughout the matrix.

9. The device of claim 1 wherein the layer comprises:
   a deformable matrix;
   first ones of the capsules being distributed in the matrix and containing the first substance;
   second ones of the capsules being distributed in the matrix and containing the second substance.

10. The device of claim 1 further comprising:
    a flange member fixed relative to the intermediate member, the flange member defining a through hole to accommodate the elongate member;
    a first engagement surface on the flange member faced toward the clamping members;
    second engagement surfaces on the clamping members, the second engagement surfaces contacting the first engagement surface during the deployed position of the clamping members.

11. The device of claim 11 comprising three or more clamping members.

12. The device of claim 1 wherein:
    the device is a repair mechanism for a pressurizable elastomeric liner conformed in the pressurised condition to an inner peripheral surface of a casing;
    the elongate member has a head countersunk into the plate;
    the plate defines tapered edges forming a smooth transition from the plate to the wall.

13. A device for sealingly repairing a hole in a wall of a pressurizable enclosure, comprising:
    a plate defining an aperture;

an elongate member extending through the aperture into the enclosure;

an intermediate member engaged to the elongate member;

the intermediate member forming a channel having open ends;

a flexible elastic body softer than the channel fit closely within the channel, the elastic body defining an aperture therethrough closely fit with the elongate member;

clamping members movably connected to the intermediate member, the clamping members having a folded position where the clamping members are disposed along the elongate member, the clamping members swingable from the folded position to a deployed position;

engaging surfaces on the clamping members, the engaging surfaces faced toward the plate during the deployed position of the clamping members;

end faces of the clamping members swinging into the channel through the open ends as the clamping members approach the deployed position;

wherein the end faces deform the elastic body into sealing engagement with the elongate member during the deployed position;

a layer on the engaging surfaces, the layer comprised of two at least initially segregated substances, a first substance being a curable adhesive resin and a second substance being a setting agent for the resin, at least one of the substances contained in breakable capsules in the layer.

14. A device for repairing a hole in a wall, comprising:

a plate defining an aperture;

an elongate member extending through the aperture;

an intermediate member engaged to the elongate member;

the intermediate member forming a channel having open ends;

a flexible elastic body softer than the channel fit closely within the channel, the elastic body defining an aperture therethrough closely fit with the elongate member;

clamping members swingable relative to the intermediate member, the clamping members having a folded position where the clamping members are disposed along the elongate member, the clamping members swingable from the folded position to a depolyed position in which end faces of the clamping members press the body at the channel's open ends thereby sealingly tightening the contact between the body and the elongate member;

engaging surfaces on the clamping members, the engaging surfaces faced toward the plate during the deployed position of the clamping members;

a flexible neck integrally connecting the clamping members to the intermediate member;

a continuous surface formed by the engaging surfaces, a portion of the intermediate member and a facial zone of the neck;

the device having a post deployment configuration wherein the continuous surface bears sealingly against the wall;

a layer on the engaging surfaces having two initially separate substances, a first substance being a curable adhesive resin and a second substance being a setting agent for the resin, at least one of the substances contained in breakable capsules in the layer.

15. The device of claim 14 comprising three or more clamping members.

16. The device of claim 14 further comprising:

a flange fixed relative to the intermediate member, the flange defining a through hole to accommodate the elongate member;

a first engagement surface on the flange faced toward the clamping members;

second engagement surfaces on the clamping members, the second engagement surfaces contacting the first engagement surface during the deployed position of the clamping members.

* * * * *